FAULT ISOLATION ARRANGEMENT FOR DISTRIBUTED LOGIC MEMORIES

Filed March 28, 1969

INVENTOR
B. A. CRANE
BY R C Lipton
ATTORNEY

FAULT ISOLATION ARRANGEMENT FOR DISTRIBUTED LOGIC MEMORIES

Filed March 28, 1969 5 Sheets-Sheet 5

United States Patent Office 3,553,654

Patented Jan. 5, 1971

3,553,654

FAULT ISOLATION ARRANGEMENT FOR DISTRIBUTED LOGIC MEMORIES

Bently A. Crane, Chester, N.J., assignor to Bell Telephone Laboratories, Incorporated, Murray Hill, N.J., a corporation of New York Filed Mar. 28, 1969, Ser. No. 811,378
Int. Cl. G06f *11/00*
U.S. Cl. 340—172.5 19 Claims

ABSTRACT OF THE DISCLOSURE

To provide fault detection and isolation, a distributed logic memory (DLM) system is hierarchically organized in a tree-like structure including a number of racks, each of which includes a number of levels, each of which, in turn, includes a number of computing elements. Each element which is interconnected to two adjacent elements shares common output and propagate circuitry respectively with the other elements of the same level. Likewise, each level shares common output and propagate circuitry respectively with the other levels of the same rack. Finally, each rack shares common output and propagate circuitry respectively in connecting to a control unit. Fault detection and isolation circuits are situated in the level and rack output and propagate circuits. The fault detection circuits on each level, upon receipt of faulty signals from the elements of that level, disconnect the output and propagate circuits of that level from the rest of the system and interconnect the two levels adjacent to the disconnected level. If the fault circuit of any level malfunctions, then the fault circuit of the corresponding rack detects faulty signals from any failed element and/or failed level fault circuit and accordingly disconnects the output and propagate circuits of the rack in which the failure appears from the rest of the system and interconnects the two adjacent racks.

GOVERNMENT CONTRACT

The invention herein claimed was made in the course of, or under contract with Department of the Army.

BACKGROUND OF THE INVENTION

(1) Field of the invention

The present invention is concerned with fault detection and isolation arrangements for distributed logic memory systems.

(2) Description of the prior art

A distributed logic memory (DLM) system may be generally described as a computer consisting of a large number of identical computing elements which operate concurrently under the control of a common control unit. Each computing element includes data registers for storing data and circuit logic for operating on the data. Typically, the computing elements are interconnected in a linear array with the input, output, and control circuitry from the common control unit being shared in common by the elements.

It is desirable in DLM systems to simultaneously utilize as many of the computing elements as possible to enable parallel processing of large amounts of data. However, if the elements are connected in a linear array with the output circuitry being shared in common as described above, and one of the elements fails, this element may adversely affect other elements. Even if the fault is detectable, it may be difficult to repair immediately. Furthermore, even if immediate repair is possible, there may still be a large number of other elements disabled while repair is taking place. Failure of an element in these circumstances would be especially critical, if, for example, the system was being used in a real-time control application such as missile target tracking, aircraft control, etc.

SUMMARY OF THE INVENTION

It is an object of the present invention to provide a fault detection arrangement for DLM systems which prevents failed elements of the system from adversely affecting other nonfailed elements.

In the present invention there are provided fault detection arrangements for isolating and disconnecting faulty computing elements of a DLM system from the other elements of the system and for bypassing the faulty elements so that the faulty elements will not adversely affect the nonfaulty elements.

It is still another object of the present invention to provide a fault detection and isolation arrangement which may be incorporated as an integral part of DLM systems.

It is also an object of the present invention to provide a hierarchical fault detection arrangement wherein part of the fault detection apparatus checks other of the fault detection apparatus.

These and other objects and features of the present invention are realized in a specific illustrative embodiment of a DLM system which is hierarchically organized in a tree-like structure consisting of a number of racks, each of which includes a number of levels, each of which includes a linear array of computing elements. The computing elements include input, output, control, interelement, and propagate circuitry (the latter is for propagating signals between adjacent elements). The output and propagate circuits of each element share common output and propagate circuits respectively with the other elements of the same level. Likewise, the output and propagate circuits of each level share common output and propagate circuits respectively with the other levels of the same rack. Finally, the output and propagate circuits of each rack share common circuitry respectively in connecting to a control unit. Fault detection and disabling circuits are situated in the output and propagate circuits of every level and of every rack. The fault detection circuits are also connected to certain of the interelement circuitry. (This circuitry interconnects each element with its adjacent neighbors and provides for intercommunication therebetween.)

To test for faults in the output and/or propagate circuits, the control unit commands all elements to generate certain reference signals via the output and/or propagate circuits. Faulty signals generated by "failed" elements of any level are detected by the fault circuits of that level which then disconnects the output and propagate circuits of that level from the rest of the system. The fault circuit thereupon makes an interelement circuit connection between the last element of the preceding level and the first element of the succeeding level.

If the fault circuit of any level malfunctions, then the fault circuit of the corresponding rack should detect any failed element and accordingly disconnect the output and propagate circuits of the rack in which that failed element appeared and make appropriate interconnections between elements of the preceding and succeeding rack. In this manner, checking of failed level fault circuits as well as of failed elements is provided.

To test for faults in the interelement communication circuitry, the control unit commands the elements of each level to apply a signal via the interelement communication circuitry to their adjacent neighbors in the level. These neighbor elements are then commanded to apply a signal to their neighbors and so on until signals which began at either end of the array of elements in the level have been transferred (between elements) to the opposite end and then to the fault circuit which is connected to the two end elements in the level. If a faulty signal is detected, the output and propagate circuits of the "failed" level or rack, as the case may be, are disconnected from the rest of the system and appropriate interconnects are made as described above.

BRIEF DESCRIPTION OF THE DRAWING

A complete understanding of the present invention and of the above and other objects and advantages thereof may be gained from a consideration of the following detailed description presented in connection with the accompanying drawings which are described as follows.

DETAILED DESCRIPTION

Figure 1:
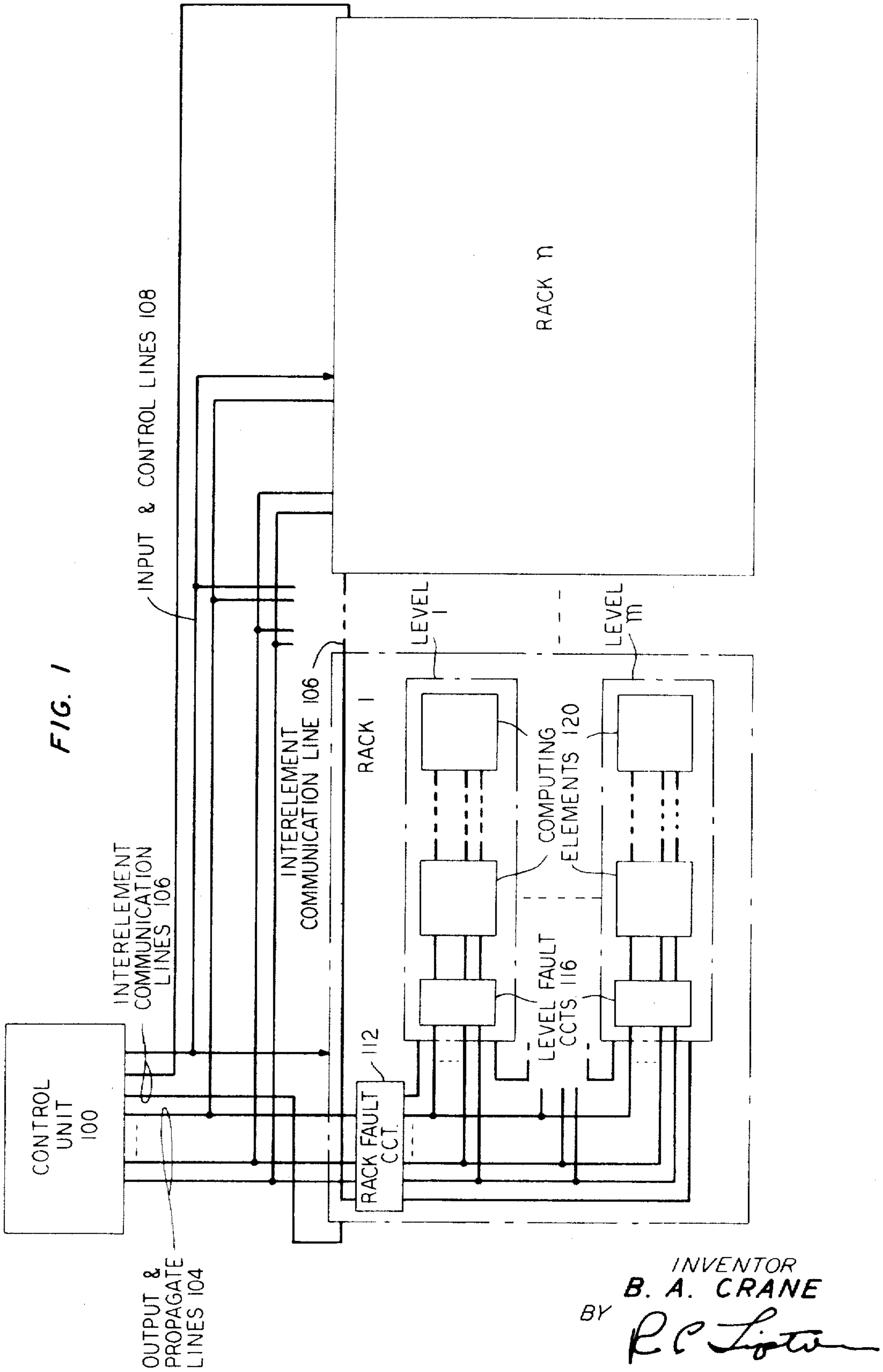
FIG. 1 shows a generalized DLM system arranged in a tree-like structure and including fault detection and isolation circuitry in accordance with the present invention.

FIG. 1 shows a control unit 100 connected via output and propagate lines 104, interelement communication lines 106, and input and control lines 108 to rack units 1 through *n*. Each rack unit in turn comprises a rack fault circuit 112 interconnecting the output and propagate lines 104 from the control unit 100 to level units 1 through *m*. Each level unit in turn comprises a level fault circuit 116 interconnecting the rack fault circuit 112 to computing elements 120. Each computing element may comprise DLM circuitry and logic such as shown in composite FIGS. 6–11 of the aforecited Crane et al. patent and described therein. (The FIGS. 6–11 circuitry of the Crane et al. patent is not referred to in the patent as a computing element but rather as a Y cell with associated X cells.)

Although the input and control lines 108 are shown as a single line in FIG. 1, it is to be understood that this single line represents a plurality of input and control lines. The input and control lines serve to transmit input data and control signals respectively from the control unit 100 to all computing elements of racks 1 through *n*. Whether or not a particular element receives and stores input data or executes a control signal depends on what is called the "activity" status of the element. An "active" element responds but an "inactive" element does not. Particular elements are made active by means of an associative search wherein applied data is compared with the data stored in the elements. Those elements in which a match occurs between the applied data and the stored data are activated. The control unit then commands the active elements to perform various operations. This is explained fully in the aforecited Crane et al. patent.

It is also possible to perform what is called a "directional match." In this case, rather than activating those elements in which a match occurs, elements adjacent (either left or right adjacent) to the elements in which a match occurs are activated. This is accomplished by means of the interelement communication lines 106. As the name connotes, the interelement communication lines interconnect each element to its adjacent neighbors (except the elements on each end of the array which are connected to the control unit 100). This, also, is explained fully in the Crane et al. patent.

The output lines serve to transmit information from the computing elements to the control unit 100. Only active elements, however, have access to the output lines, but since all elements share the output lines in common, only one active element can transmit its output to the control unit at a time. Otherwise, the information on the output line would be "garbled" in the sense that the control unit would receive the logical OR of the outputs from all "active" elements and outputs from any individual "active" element would be indistinguishable. Thus, when it is necessary to transmit information from more than one active element, it is necessary to select these active elements one at a time.

There are other situations in addition to "outputting" where it is necessary to select one of a number of active elements. This selection can usually be accomplished by the associative search technique described above. However, there are cases where this is not sufficient such as, for example, when searching for an empty computing element to receive and store some input data. Since all empty elements are activated on the basis of their contents (empty), further selection by content is not possible. The necessary further selection in such a case is carried out according to the position of a computing element in the array of elements rather than according to its contents. The propagate lines 104 and the interelement communication lines 106 shown in FIG. 1 are utilized for this purpose.

The propagate lines connect the control unit 100 to the computing elements in a linear order or array. (Although this is not apparent from FIG. 1, it will become apparent later on.) That is, the propagate line from the control unit 100 is connected first to the right-most computing element of level 1 and rack 1, then to the second from the right computing element of level 1 and rack 1 and so on through the other levels of rack 1. From the left-most computing element of level *m* and rack 1, the propagate line connects to the right-most element of level 1 and rack 2 and so on to the other levels of the other racks.

The manner of utilizing the propagate line and the interelement communication lines to select one of a number of "active" computing elements is discussed in detail in Crane, B. A. and Githens, J. A., "Bulk Processing In Distributed Logic Memory," IEEE Trans. on Electronic Computers, April 1965, pp. 190, 191. The important thing to note about the propagate line is that signals may be propagated thereover to "downstream" computing elements.

Since all elements share the output lines in common, if no fault detection and isolation were provided, a failure in any output circuit of any computing element could tie up the output lines and make them unavailable for use by any of the other elements. Likewise, if no fault detection were provided, a failure in the propagate circuitry of any computing element would break up the linear ordering of the elements and make the "downstream" elements unavailable for use. A failure in the interelement communication circuitry of any element would also break up the linear ordering, but would primarily only adversely affect adjacent elements. By organizing the computing elements into levels and racks and by the appropriate placement of fault detection and isolation circuits as shown in FIG. 1, the severity of the fault problem discussed above is greatly reduced.

To test for a fault in the output or propagate circuits of the computing elements, the control unit 100 first commands all computing elements to deliver the same "reference" signals on the output or propagate lines. The level fault circuits such as fault circuits 116 first test to see if these reference signals are being received from the computing elements on their corresponding level. If the appropriate reference signals are not received by a level fault circuit, it isolates, i.e., disconnects, the output and propagate lines of that level from the output and propagate lines of the other levels of the rack in which the fault circuit is located. After the level fault circuits complete their tests, the rack fault circuits test to see if the reference signals received are the proper signals. If the proper signals are not received by a particular rack fault circuit, the rack fault circuit isolates or disconnects the output and propagate lines of the corresponding rack from the output and propagate lines of the other racks. In this manner, each level fault circuit checks for faults in the output and propagate circuits of each computing element in its level. If a level fault circuit fails to detect a genuine fault because, for example, it itself is faulty, then the rack fault circuit should detect this fault, thereby providing a double check on the computing elements and a check on the level fault circuits.

Since isolating a level or rack in which a fault was detected would, in effect, leave a "gap" in the interelement communication lines, it is necessary to make provision for closing this "gap." This is done by the level fault circuits if a level is being isolated or the rack fault circuits if a rack is being isolated. The level fault circuit upon detecting a fault connects the last element of the previous adjacent level to the first element of the next adjacent level. The rack fault circuit upon detecting a fault performs a similar operation. This will be discussed in detail later.

To test for faults in the interelement communication circuitry of the computing elements, the control unit 100 commands the elements of each level to apply a "reference" signal via the interelement communication circuitry to their adjacent neighbors in the level. These neighbor elements are then commanded to apply the "reference" signal to their neighbors and so on until signals which began at each end of the array of elements in the level have been transferred from element to element to the opposite end and then to the level fault circuit. Although not shown in FIG. 1, the fault circuit on each level is connected via interelement communication circuitry to the two end elements of the level. This will be shown in detail later. If the "reference" signal reaching the level fault circuit is faulty, the output and propagate circuits of the "failed level" are disconnected from the rest of the system and appropriate interconnections made as described above. The rack fault circuits then perform a similar operation to test for faults in the interelement communication circuitry.

Figure 2:
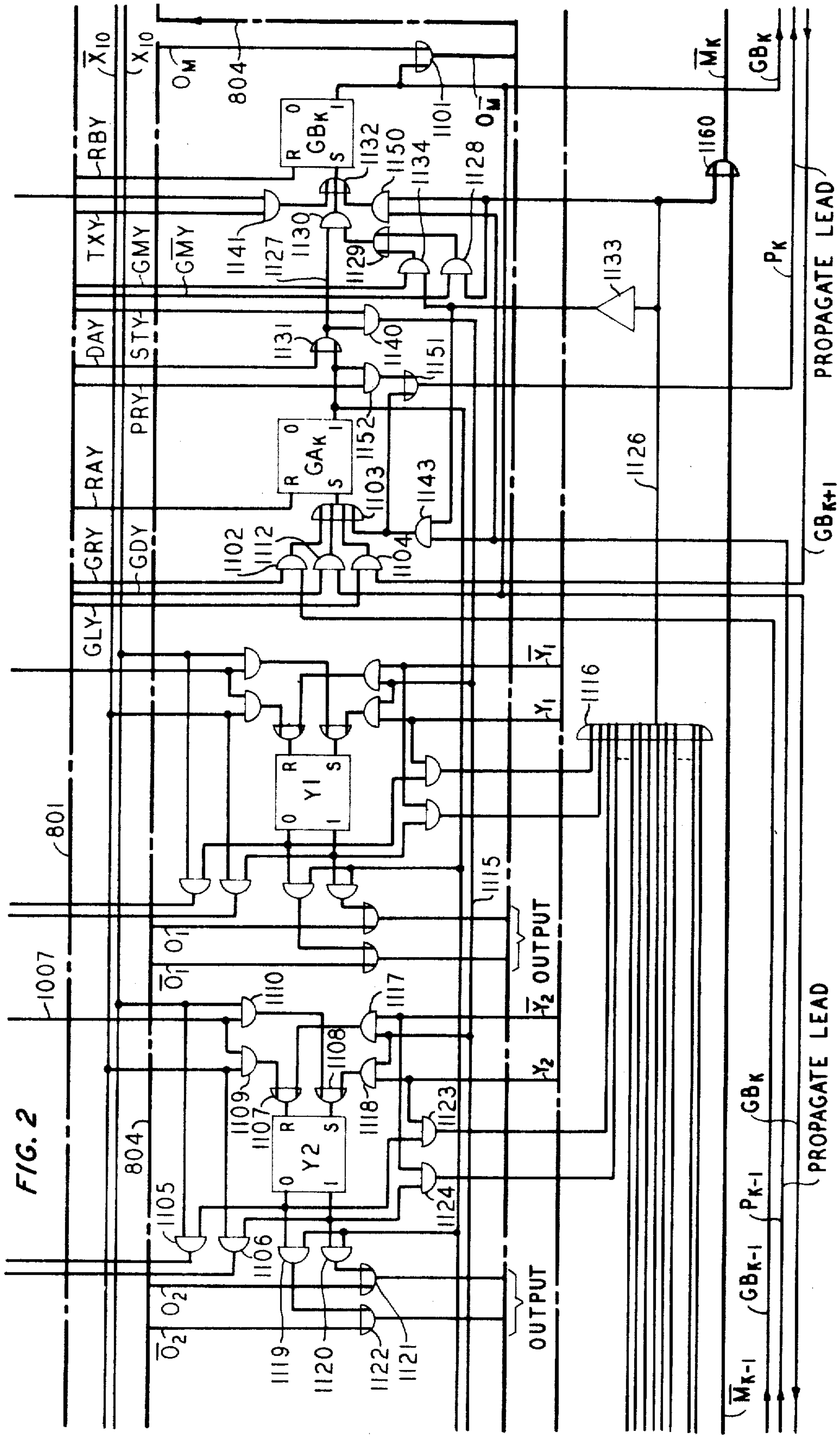
FIG. 2 shows a portion of a computing element substantially as disclosed in B. A. Crane-J. A. Githens Pat. 3,376,555, issued Apr. 2, 1968, and modified in accordance with the present invention.

FIG. 2 shows a portion of an illustrative computing element. This portion is essentially the same as that shown in FIG. 11 of the aforecited Crane et al. patent. Portions of the computing element not shown would include data flip-flops located above and to the left of FIG. 2 and various control logic. The only data flip-flops shown in FIG. 2 are the $Y_1$ and $Y_2$ flip-flops. The $GA_k$ and $GB_k$ flip-flops are control flip-flops fully described in the Crane et al. patent. The subscript *k* is used to indicate that the computing element shown is the $k^{th}$ computing element in the array. New leads $\overline{M}_{k-1}$ and $\overline{M}_k$ and OR gate 1160 have been added to the Crane et al. circuitry in accordance with the principles of the present invention, and these are shown in FIG. 2 in heavier line drawing. These new leads when "high" indicate that a mismatch has occurred between applied data and data stored in the Y cells of one or more of the computing elements. The lead $\overline{M}_{k-1}$ extends from an adjacent computing element in the array identified as the $k-1$ element. The lead $\overline{M}_k$ extends to the next computing element in the array which would be the $k+1$ computing element.

Cable 804 of FIG. 2 is a common data output conductor. The portion of the cable 804 shown at the top of the drawing extends from the previous $k-1$ computing element. The portion of the cable 804 shown at the bottom of the drawing extends to the next adjacent computing element $k+1$. The output leads from the $Y_1$ and $Y_2$ flip-flops are labeled $O_1$, $\overline{O}_1$ and $O_2$, $\overline{O}_2$, respectively. The cable 804 thus consists of a number of lead pairs corresponding to the number of Y flip-flops in a computing element. Data may be read from the Y flip-flops of any single computing element in parallel. But, as indicated earlier, readout may only take place from one computing element at a time, otherwise the output information would be "garbled."

In addition to the pairs of output conductors, from each of the Y flip-flops, the cable 804 also includes output conductor $O_m$. If the $GB_k$ flip-flop in any of the computing elements is in the set condition, the $O_m$ conductor is made "high." The conductor $O_m$ along with conductor PRY and conductor P are provided in order that a particular propagate command be executed. This command which is described in detail in the forecited Crane et al. patent is essentially the following: "Activate all computing elements between each already active computing element and the first computing element to its right that does not match the input pattern, and in each of these first cells to the right whose contents do not match the input pattern, also set its GB flip-flop in the 1 state." The utlity of this command, as indicated earlier, is in conjunction with several other commands to select one of a number of active computing elements. Propagate lead $P_{k-1}$ extends from the $k-1$ computing element to AND gate 1143. Propagate lead $P_k$ from OR gate 1151 extends to the next adjacent computing element $k+1$.

Leads $GB_{k-1}$, $GB_k$, and $GB_{k+1}$ comprise the interelement communication leads discussed earlier. Lead $GB_{k-1}$ extends from $k-1$ computing element to AND gate 1102. Lead $GB_k$ extends from flip-flop $GB_k$ to the $k-1$ and $k+1$ computing elements. Lead $GB_{k+1}$ extends from the $k+1$ computing element to AND gate 1104.

Figure 3:
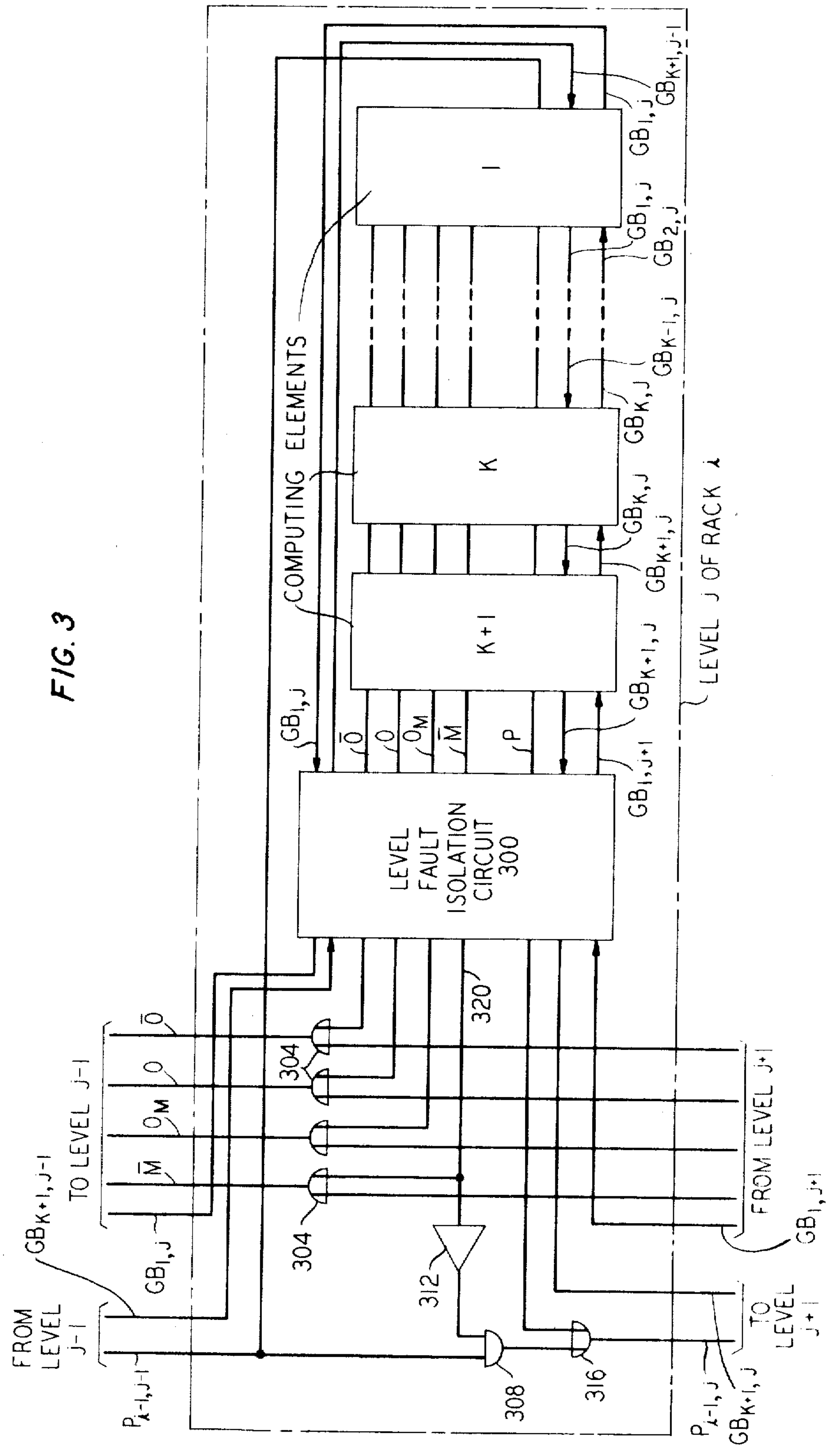
FIG. 3 shows level logic circuitry of a system made in accordance with the principles of the present invention.

Illustrative level logic circuitry is shown in FIG. 3. Only those leads germane to the fault isolation function are shown. The level of FIG. 3 (labeled level *j* of rack *i*) includes $k+1$ computing elements ordered in a linear array. Each computing element in turn includes circuitry such as that shown in FIGS. 6 through 11 of the previously cited Crane et al. patent. Furthermore each element shares common output leads, O, $\overline{O}$ (representing a plurality of Y cell output pairs) and $O_m$ and a common mismatch lead $\overline{M}$. FIG. 3 also shows the GB leads between the elements of level *j* and the GB leads going to and from levels $j-1$ and $j+1$. A propagate lead P interconnects the elements in a linear ordering as shown in detail in FIG. 2.

The test for the output leads O, $\overline{O}$, $O_m$, the mismatch lead $\overline{M}$ and the propagate lead P will now be described. The test is begun with the control unit 100 commanding all elements (via input leads not shown in FIG. 3) to deliver the same "reference" signals on the output leads O, $\overline{O}$, $O_m$, over the mismatch lead $\overline{M}$ or over the propagate line P. The control unit 100 then signals level fault isolation circuits such as circuit 300 of FIG. 3 to test the signals being received from the computing elements on its respective level via the output, match and propagate leads. If no faulty signals are detected, the fault isolation circuit simply passes the signals it receives to the other levels of the rack via OR gates 304, or 316, or AND gate 308. That is, the computing elements of the level are not isolated from the other elements of the system.

If a faulty signal is detected by the level fault isolation circuit on one of the leads from the computing elements on the corresponding levels, the isolation circuit in effect disconnects the output match and propagate leads of the elements on the level from the other elements of the system. That is, the fault isolation circuit 300 will not pass signals received over the output leads O, $\overline{O}$, $O_m$, the mismatch lead $\overline{M}$ or the propagate lead P to either of the next nearest levels. This, in effect, results in the removal of the computing elements of the level from the system. Disconnecting the computing elements by the fault isolation circuit 300 also results in a "low" signal being applied continually to lead 320 which is then inverted by an inverter 312 resulting in a "high" signal being applied continually to AND gate 308. Thus any signals received from level $j-1$ over the propagate lead $P_{i-1,\ j-1}$ will be transmitted via AND gate 308 and OR gate 316 to the next level. In this manner, the linear ordering of the computing elements in the system with respect to the propagate lead is not disrupted. Rather, the elements of the level *j* are simply removed from the linear ordering and element $k+1$ of level $j-1$ is connected directly to element 1 of level $j+1$, i.e., a "short cut" is taken thus bypassing the elements of level *j*. This "short cut" is also provided for the interelement circuitry (GB leads) by connecting lead $GB_{k+1,\ j-1}$ directly to element 1 of level $j+1$ and lead $GB_{1, j+1}$ directly to element $k+1$ of level $j-1$. The test for the interelement communication leads GB was generally described earlier and is similar to that performed for the other leads of FIG. 3 described above.

Figure 4:
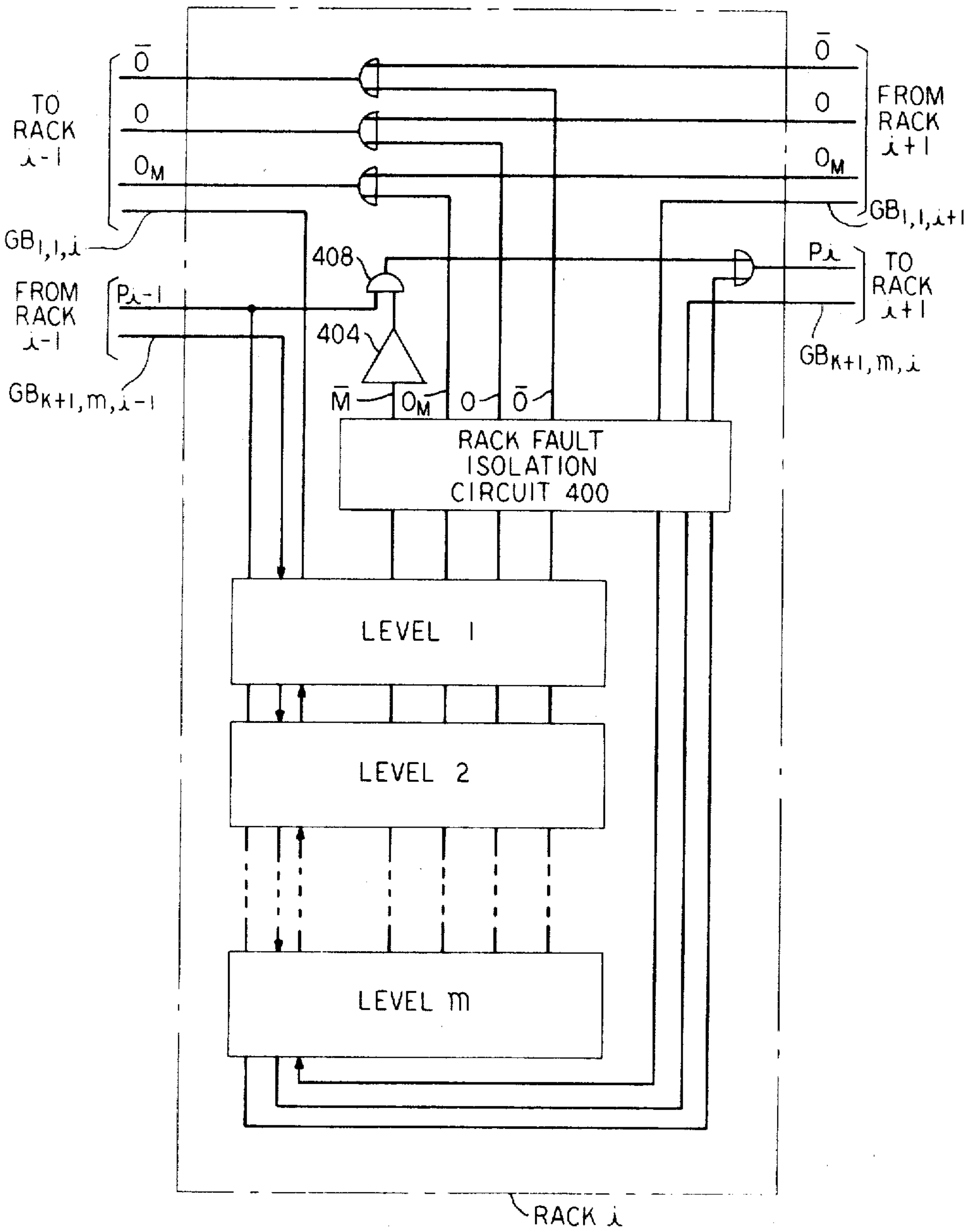
FIG. 4 shows rack logic circuitry.

FIG. 4 shows an illustrative rack $i$ comprising $m$ levels, a fault isolation circuit 400, and associated rack logical circuitry. The rack organization is similar to the level organization except that a mismatch signal is not transferred among the various racks as it is among the levels.

After commanding each level fault isolation circuit to perform the test on the computing elements of the various levels, the control unit 100 commands the rack fault isolation circuits such as isolation circuit 400 of FIG. 4 to examine the signals received from the various levels of the respective rack. If no faulty signals are detected, then the rack fault isolation circuit 400 simply passes the signals received from the levels to the adjacent racks. If a faulty signal is detected, for example, because of a faulty level fault isolation circuit, then the rack fault isolation circuit 400 disconnects the output leads O, $\overline{O}$, $O_m$, the mismatch lead $\overline{M}$ and the propagate lead $P_{1, j}$ of levels $i$ through $m$ from the other levels of the system. As before, when the levels of a rack are disconnected, a "low" signal is applied by the rack fault isolation circuit 400 to an inverter 404 which, in turn, applies a high signal to AND gate 408 thereby enabling the transfer of propagate signals received from rack $i-1$ to rack $i+1$. Further, the appropriate GB leads between racks $i+1$ and $i-1$ are connected. Thus, just as with levels, an entire rack may be removed from the system if a fault is detected in one of the levels of the rack.

Figure 5:
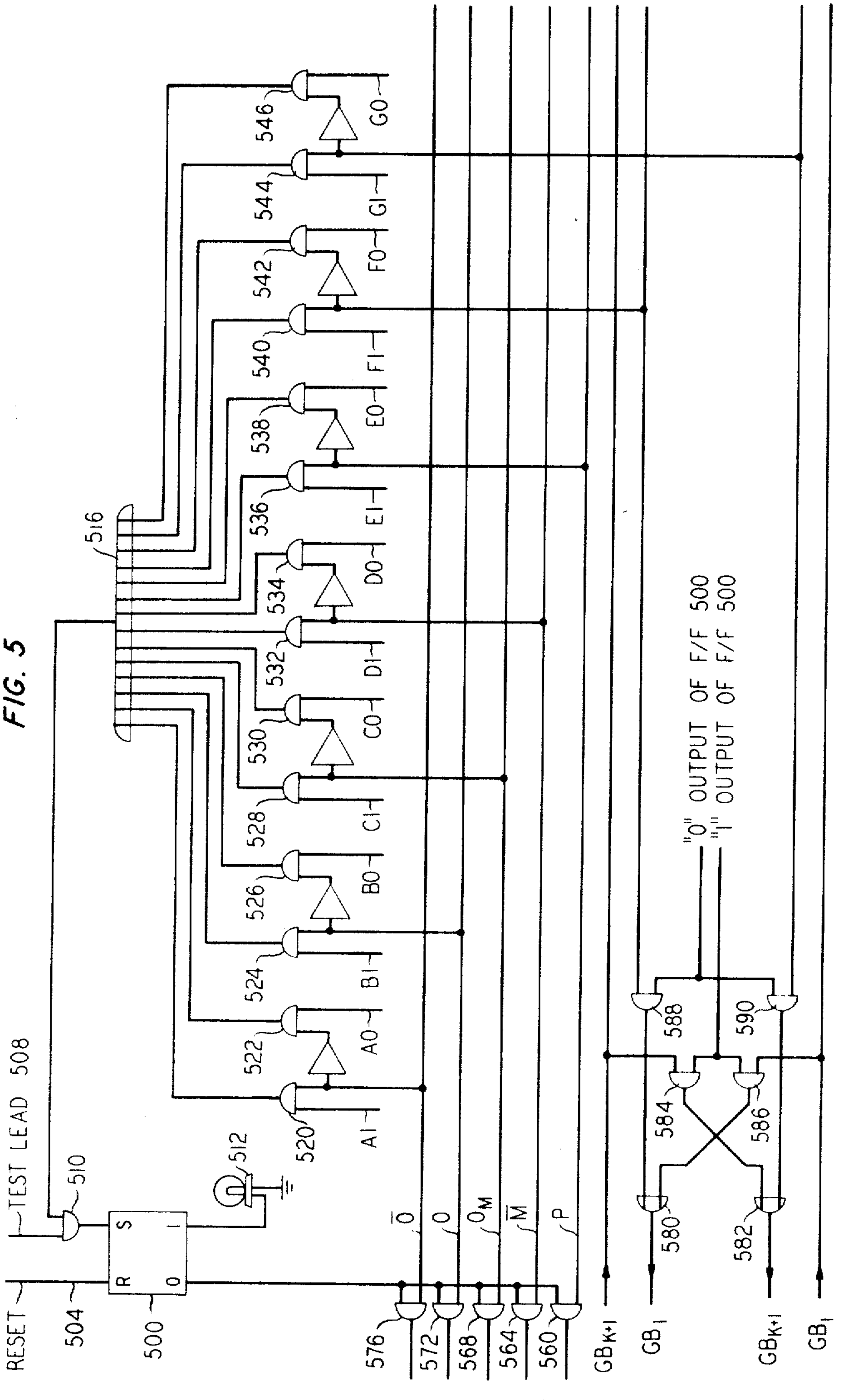
FIG. 5 shows a fault detection circuit made in accordance with the principles of the present invention.

FIG. 5 shows a fault isolation circuit suitable for use as a level or a rack fault isolation circuit. The circuit includes AND gates 520 through 546 each of which includes one input from the control unit 100. AND gates 520, 524, 528, 532, 536, 540 and 544 include a second input directly from leads $\overline{O}$, O, $O_m$, $\overline{M}$, P, GB, and $GB_{k+1}$ respectively. AND gates 522, 526, 530, 534, 538, 542 and 546 include a second input from an inverter connected to leads $\overline{O}$, O, $O_m$, $\overline{M}$, P, GB, and $GB_{k+1}$ respectively. The fault isolation circuit further includes an OR gate 516 the inputs of which comprise the outputs of the ten AND gates 520 through 546. The output of OR gate 516 is connected via an AND gate 510 to the "set" stage of a flip-flop 500. AND gate 510 includes a second input 508 from the control unit 100. The "reset" stage of the flip-flop 500 is also connected to the control unit 100 via a lead 504. The output of the "set" stage of the flip-flop is connected to a lamp 512 and to AND gates 584 and 586. The output of the "reset" stage of the flip-flop 500 is connected to AND gates 560, 564, 568, 572, 576, 588 and 590. The $GB_1$ and $GB_{k+1}$ leads entering FIG. 5 from the left from, for example, adjacent levels are connected to AND gates 586 and 584 respectively. The $GB_1$ and $GB_{k+1}$ leads entering FIG. 5 from the right from, for example, the level controlled by the depicted fault circuit are connected to AND gates 588 and 590 respectively.

A fault check is initiated with the flip-flop 500 in the "reset" stage. When in the "reset" stage, all signals applied to leads $\overline{O}$, O, $O_m$, $\overline{M}$, P, $GB_1$, and $GB_{k+1}$ are transferred via the respective AND gates 576, 572, 568, 564, 560, 588, and 590 and OR gates 580 and 582 to the next level or rack as the case may be. To test for a fault, as indicated earlier, the control unit 100 commands the computing elements to deliver certain signals to some or all of leads $\overline{O}$, O, $O_m$, $\overline{M}$, P, $GB_1$, and $GB_{k+1}$. For example, the control unit 100 may signal each of the computing elements to place a certain Y flip-flop in the "set" state. If operations were normal, then the output lead of that flip-flop would be in a "high" condition and the $\overline{O}$ output lead would be in in a "low" condition. Assuming for this example that the $\overline{O}$ and O lead of FIG. 5 represents just the output leads of one particular flip-flop (rather than a plurality of flip-flops), then a "low" signal would be expected to be received over lead $\overline{O}$ and a "high" signal would be expected to be received over the O lead.

To test whether the appropriate signals were being received from the computing elements, the control unit 100 next applies a signal to lead 508 and to selected ones or all of leads $A_1$ through $G_0$ depending on the command which the control unit had given the computing elements, i.e., depending on what signals were expected over leads $\overline{O}$, O, $O_m$, $\overline{M}$, P, GB and $GB_{k+1}$. In the example above of the setting of a Y flip-flop, since a "low" signal is expected on the $\overline{O}$ lead an a "high" signal is expected on the O lead, the control unit 100, in order to test these conditions, would apply a "low" signal to lead $A_0$, a "high" signal to lead $A_1$ a "high" signal to lead $B_0$, and a "low" signal to lead $B_1$. Thus, if an improper signal were received over either lead $\overline{O}$ or O, then the appropriate AND gates 520, 522, 524 or 526 would be enabled thereby enabling OR gate 516. OR gate 516 in conjunction with the signal applied to lead 508 would enable AND gate 510 thereby setting the flip-flop 500. For example, if an improper "high" signal were received over lead $\overline{O}$ (rather than the expected "low" signal) then this "high" signal in conjunction with the "high" signal applied to lead $A_1$ would enable AND gate 520 leading to the setting of the flip-flop 500. Setting flip-flop 500 causes the lamp 512 to light thereby providing a visual indication that a fault has been detected in the rack or the level, as the case may be. Setting flip-flop 500 also causes a "high" signal to be applied to AND gates 584 and 586, and a "low" output from the "reset" stage of the flip-flop. Thus, signals applied over the $GB_{k+1}$ and $GB_1$ leads from the left will take "shortcuts" via AND gates 584 and 586 respectively thereby bypassing the failed level or rack. Further, none of the AND gates 560 through 576 will be enabled when signals are received over leads P, $\overline{M}$, $O_m$, O, $\overline{O}$ respectively.

In this manner, the fault isolation circuit of FIG. 5 provides for isolating the output, match, and propagate leads of a level or rack from the other levels and racks in the system and for allowing the interelement communication signals to bypass levels or racks containing faulty elements. When this is done, the other levels and racks can continue operating in the normal manner with no degradation resulting from the faulty element.

What is claimed is:

1. A distributed logic memory computer system including a control unit, a linear array of interconnected computing elements, output circuitry interconnecting said control unit with said elements and shared in common by said elements, and means for applying input data and control signals from said control unit simultaneously to said computing elements, said elements including means for applying output signals to said output circuitry, characterized in that said computer system is organized into a plurality of levels each of which include a plurality of computing elements and fault detection circuitry responsive to certain output signals from any one of the elements in the level for disconnecting the elements of the level from the common output circuitry and for interconnecting the preceding and succeeding levels.

2. A system as in claim 1 wherein said computer system is further organized into a plurality of racks each of which include a plurality of levels and fault detection circuitry responsive to certain output signals from any one of the elements of the levels in the rack for disconnecting the levels of said rack from the common output circuitry and for interconnecting the preceding and succeeding racks.

3. A system as in claim 2 wherein said computing elements each further includes a plurality of data storage registers, means for comparing data stored in said data storage registers with applied data, and mismatch circuitry for transmitting a signal to the corresponding level fault detection circuitry upon the occurrence of a mismatch between said stored data and said applied data, and wherein said system further includes propagation circuitry interconnecting said computing elements in a linear array for propagating signals to adjacent elements in one direction in accordance with applied signals and in accordance with data stored in said storage registers and interelement communication circuitry for applying signals from any element to its two adjacent elements, said level fault detection circuitry interconnecting the last computing element in the linear array of elements of the corresponding level to a next succeeding level for disconnecting the computing elements of the corresponding level from the common output ciricuitry and from the propagate circuitry of the other levels, and said rack fault detection circuitry interconnecting the last computing element in the last level in the linear array of elements of the corresponding rack to a next adjacent rack for disconnecting the computing elements of the corresponding rack from the common output circuitry and from the propagate circuitry of the other racks.

4. A system as in claim 3 wherein each of said levels further include:

- OR logic for transmitting output signals and signals indicating a mismatch received from either the level fault detection circuitry or from a first adjacent level to a second adjacent level, and
- AND-OR logic for applying propagate signals to said first adjacent level either upon receipt of propagated signals from the level fault detection circuitry, or upon the concurrence of receipt of propagate signals from said second adjacent level and receipt of the complement of a mismatch signal from the level fault detection circuitry.

5. A system as in claim 4 wherein each of said racks further include:

- OR logic for transmitting output signals received from either the rack fault detection circuitry or from a first adjacent rack to a second adjacent rack, and
- AND-OR logic for applying propagate signals to said first adjacent rack either upon receipt of propagate signals from the rack fault detection circuitry or upon the concurrence of receipt of propagate signals from said second adjacent rack and receipt of the complement of a mismatch signal from the rack fault detection circuitry.

6. A system as in claim 5 wherein each of said fault detection circuits comprises input circuitry for receiving output, mismatch and propagate signals, bistable means responsive to said control unit and to the receipt of certain signals on said input circuitry for assuming a first stable state, and AND logic responsive to said bistable means residing in a second stable state for enabling the transfer therethrough of signals applied to said input circuitry.

7. A system as in claim 6 wherein each of said level fault detection ciricuits further comprises means responsive to said bistable means residing in said second stable state for connecting the interelement communication circuitry of the first element in the corresponding level to the last element in the preceding level, and for connecting the interelement communication circuitry of the last element in the corresponding level to the first element in the succeeding level, and means responsive to said bistable means residing in said first stable state for connecting the interelement communication circuitry of the last element of the preceding level to the interelement communication circuitry of the first element of the succeeding level.

8. A system as in claim 7 wherein each of said rack fault detection circuits further comprises means responsive to said bistable means residing in said second stable state for connecting the interelement communication circuitry of the first element of the first level of the corresponding rack to the last element of the last level of the preceding rack and for connecting the interelement communication circuitry of the last element of the last level of the corresponding rack to the first element of the first level of the succeeding rack, and means responsive to said bistable means residing in said first stable state for connecting the interelement communication ciricuitry of the last element of the last level of the preceding rack to the interelement communication circuitry of the first element of the first level of the succeeding rack.

9. A distributed logic memory system comprising:

- a control unit,
- a plurality of racks (1 . . . $n$), each of said racks comprising a plurality of levels (1 . . . $m$) and a fault detection circuit, each of said levels comprising a plurality of computing elements (1 . . . $k+1$) interconnected in a linear array and fault detection circuit,
- means for applying input data and control signals simultaneously to said computing elements,
- means in each of said computing elements and responsive to said data and control signals for generating signals,
- common output circuitry connecting said computing elements to said control unit for transmitting output signals from said elements to said control unit, and
- propagate circuitry interconnecting all of said elements in a linear array beginning with element 1 of level 1 of rack 1 and ending with element $k+1$ of level $m$ of rack $n$ and connecting said elements to said control unit for propagating signals from element to element in said array in accordance with said data and control signals,
- said level fault circuits operable to disconnect the elements of the corresponding level from the common output circuitry and from the propagate circuitry and to interconnect element $k+1$ of the preceding level to element 1 of the succeeding level in response to certain output or propagate signals from the elements of the corresponding level, and said rack fault circuits operable to disconnect the levels of the corresponding rack from the common output circuitry and from the propagate circuitry and to interconnect element $k+1$ of level $m$ of the preceding rack to element 1 of level 1 of the succeeding rack in response to certain output or propagate signals from the elements of the corresponding rack.

10. A system as in claim 9 wherein said elements each further comprise a plurality of data registers, means for comparing data stored in said registers with applied input data, means for transmitting a mismatch signal to the level fault circuit upon the occurrence of a mismatch between the stored data and applied data in any of the elements of the corresponding level, and wherein each level $j$ of rack $i$ further comprises means for transmitting a propagate signal to level $j+1$ either upon the receipt of a propagate signal from element $k+1$ of level $j$ via the fault detection circuit of level $j$ or upon the occurrence of the receipt of a propagate signal from level $j-1$ and the receipt of the complement of said mismatch signal from the fault detection circuit of level $j$.

11. A system as in claim 10 wherein each level $j$ of rack $i$ further comprises means for transmitting output and mismatch signals to level $j-1$ upon the receipt of such signals either from level $j+1$ or from the fault detection circuit of level $j$ of rack $i$.

12. A system as in claim 11 wherein each rack $i$ further comprises means for transmitting a propagate signal to rack $i+1$ either upon the receipt of a propagate signal from element $k+1$ of level $m$ of rack $i$ via the fault detection circuit of rack $i$ or upon the concurrence of the receipt of a propagate signal from rack $i-1$ and the receipt of the complement of said mismatch signal from the fault detection circuit of rack $i$.

13. A system as in claim 12 wherein each rack $i$ further comprises means for transmitting output signals to rack $i-1$ upon the receipt of such signals either from rack $i+1$ or from the fault detection circuit of rack $i$.

14. A system as in claim 13 wherein each of said fault detection circuits comprises input circuitry for receiving output, mismatch and propagate signals, output circuitry for transmitting output, mismatch and propagate signals, bistable means responsive to said control unit and to the receipt of certain signals on said input circuitry for assuming a first stable state, and AND logic responsive to said bistable means residing in a second stable state for applying signals received on said input circuitry to said output circuitry.

15. A system as in claim 14 wherein each of said level fault detection circuits further comprises means responsive to said bistable means residing in said second stable state for transferring signals from element $k+1$ of the preceding level to element 1 of the corresponding level and for transferring signals from element 1 of the succeeding level to element $k+1$ of the corresponding level, and means responsive to said bistable means residing in said first state for transferring signals from element $k+1$ of the preceding level to element 1 of the succeeding level, and for transferring signals from element 1 of the succeeding level to element $k+1$ of the preceding level.

16. A system as in claim 15 wherein each of said rack fault detection circuits further comprises means responsive to said bistable means residing in said second state for transferring signals from element $k+1$ of level $m$ of the preceding rack to element 1 of level 1 of the corresponding rack, and for transferring signals from element 1 of level 1 of the succeeding rack to element $k+1$ of level $m$ of the corresponding rack, and means responsive to said bistable means residing in said first state for transferring signals from element $k+1$ of level $m$ of the preceding rack to element 1 of level 1 of the succeeding rack, and for transferring signals from element 1 of level 1 of the succeeding rack to element $k+1$ of level $m$ of the preceding rack.

17. A system as in claim 16 wherein the bistable means of each of said level fault detection circuits is further responsive to said control unit and to the receipt of certain signals from element $k+1$ of the preceding level or from element 1 of the succeeding level for assuming said first stable state.

18. A system as in claim 17 wherein said bistable means of each of said rack fault detection circuits is further responsive to said control unit and to the receipt of certain signals from element $k+1$ of level $m$ of the preceding rack or from element 1 of level 1 of the succeeding rack for assuming said first stable state.

19. A distributed logic memory system comprising:

a plurality of interconnected memory elements, various elements being grouped to form levels, various levels, in turn, being grouped to form racks, said elements comprising propagate circuitry for applying signals to adjacent elements in response to received signals, and output circuitry, each of said levels comprising output and propagate circuitry connected to the output and propagate circuitry respectively of each element in the level, each of said racks comprising output and propagate circuitry connected to the output and propagate circuitry respectively of each level in the rack, a central control unit connected to the output and propagate circuitry of each of said racks for applying signals thereto and receiving signals therefrom, and fault isolation means connected to the output and propagate circuitry of each level and the output and propagate circuitry of each rack for temporarily disconnecting the output and propagate circuitry of any level from the output and propagate circuitry of the corresponding rack upon receipt of certain signals from any of said elements in said level and for temporarily disconnecting the output and propagate circuitry of any rack from said central control unit upon receipt of certain signals from any of said levels in said rack.

References Cited

UNITED STATES PATENTS

| | | |
|---|---|---|
| 3,343,135 | 9/1967 | Freiman et al. |
| 3,387,276 | 6/1968 | Reichow. |
| 3,444,528 | 5/1969 | Lovell et al. |

GARETH D. SHAW, Primary Examiner